(12) United States Patent
Jiang et al.

(10) Patent No.: US 10,313,825 B2
(45) Date of Patent: Jun. 4, 2019

(54) CONTROL PLANE LCS SOLUTION FOR IMPROVING MULTIPLE REPORTING LPP MESSAGING

(71) Applicant: QUALCOMM Incorporated, San Diego, CA (US)

(72) Inventors: Yongjin Jiang, San Diego, CA (US); Stephen William Edge, Escondido, CA (US); Ie-Hong Lin, Cupertino, CA (US); Srigouri Kamarsu, Cupertino, CA (US); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/713,618

(22) Filed: Sep. 23, 2017

(65) Prior Publication Data

US 2018/0249283 A1 Aug. 30, 2018

Related U.S. Application Data

(60) Provisional application No. 62/465,049, filed on Feb. 28, 2017.

(51) Int. Cl.
*H04W 24/00* (2009.01)
*H04W 4/02* (2018.01)
*H04W 4/20* (2018.01)

(52) U.S. Cl.
CPC ............ *H04W 4/02* (2013.01); *H04W 4/20* (2013.01)

(58) Field of Classification Search
CPC ................. H04W 4/00–029; H04W 4/12–20
See application file for complete search history.

(56) References Cited

U.S. PATENT DOCUMENTS

| | | | |
|---|---|---|---|
| 2012/0015666 A1 | 1/2012 | Horn et al. | |
| 2012/0136623 A1* | 5/2012 | Edge | G01S 5/0284 702/150 |
| 2012/0196615 A1 | 8/2012 | Edge | |
| 2012/0329476 A1* | 12/2012 | Tenny | H04W 64/00 455/456.1 |
| 2013/0022009 A1* | 1/2013 | Yang | H04L 1/0031 370/329 |
| 2013/0176897 A1* | 7/2013 | Wang | H04W 12/06 370/254 |
| 2013/0223626 A1* | 8/2013 | Edge | H04W 4/06 380/270 |

(Continued)

OTHER PUBLICATIONS

International Search Report and Written Opinion—PCT/US2017/068195—ISA/EPO—dated Mar. 23, 2018.

(Continued)

*Primary Examiner* — San Htun
(74) *Attorney, Agent, or Firm* — Kilpatrick Townsend & Stockton, LLP

(57) ABSTRACT

Techniques described herein are directed toward an enhanced LTE positioning protocol for multiple location reporting (with non-final and final fixes) that can be utilized by a user equipment (UE) to help prevent a disruption of the communication of information for a final location fix from the UE to a location server. In particular, techniques help ensure that the location server will not acknowledge receipt of the information provided by the UE in communication for a non-final fix.

20 Claims, 5 Drawing Sheets

(56) References Cited

U.S. PATENT DOCUMENTS

| | | |
|---|---|---|
| 2014/0073347 A1 | 3/2014 | Yongjin et al. |
| 2014/0087759 A1* | 3/2014 | Blumstein ............. H04W 4/025 455/456.2 |
| 2014/0176366 A1* | 6/2014 | Fischer ............... H04W 64/006 342/374 |
| 2014/0242965 A1* | 8/2014 | Lee ....................... H04W 64/00 455/418 |
| 2015/0148063 A1 | 5/2015 | Jung et al. |

OTHER PUBLICATIONS

Qualcomm Incorporated., et al., "Addition of an Early Position Fix in LPP," 3GPP Draft, 3GPP TSG-RAN WG2, Meeting #87bis, R2-144116, vol. RAN WG2, No. Shanghai, P.R. China, Oct. 6, 2014-Oct. 10, 2014, Oct. 5, 2014, 10 pages, XP050876395, Retrieved from the Internet: URL:http://www.3gpp.org/ftpjMeetings_3GPP_SYNC/RAN2/Docs/ [retrieved on Oct. 5, 2014].

Rohde & Schwarz: "Changing Subtest Definition of UE POS Test Case 7.3.4.4", 3GPP Draft; Draft_R5-171XXX TS-37571-2 TC 7-3-4-4, 3rd Generation Partnership Project (3GPP), Mobile Competence Centre 550, Route Des Lucioles; F-06921 Sophia-Antipolis Cedex; France, vol. RAN WG5, No. Athens, Greece; Feb. 13, 2017-Feb. 17, 2017, Jan. 24, 2017, XP051227205, Retrieved from the Internet: URL:http://www.3gpp.org/ftp/tsg_ran/WG5_Test_ex-T1/Workshop/TSGR5_WorkShop_2017/Docs/ [retrieved on Jan. 24, 2017], 12 pages.

* cited by examiner

CONTROL PLANE LCS SOLUTION FOR IMPROVING MULTIPLE REPORTING LPP MESSAGING

RELATED APPLICATIONS

This application claims the benefit of U.S. Provisional Application No. 62/465,049, filed Feb. 28, 2017, entitled "CONTROL PLANE LCS SOLUTION FOR IMPROVING MULTIPLE REPORTING LPP MESSAGING", which is assigned to the assignee hereof, and incorporated by reference herein in its entirety.

BACKGROUND

A Long Term Evolution (LTE) network may support Location Services (LCS) to help determine an estimated location (called a "position fix" or a "location fix") of a user equipment (UE), which may be provided to an LCS client. This estimated location can come to the LCS client in multiple phases: one or more (less accurate) non-final fixes, and a (more accurate) final fix. These position fixes can be determined via communications between the UE and a location server. In some instances, however, problems in communicating information from the UE for the non-final fix(es) may prevent the communication of the information for the final fix and even stop or impede the transfer of other location information between the UE and the location server.

SUMMARY

Techniques described herein are directed toward an enhanced LTE e protocol for multiple location reporting (with non-final and final fixes) that can be utilized by a user equipment (UE) to help prevent a disruption of the communication of information for a final location fix from the UE to a location server. In particular, techniques help ensure that the location server will not acknowledge receipt of the information provided by the UE in communication for a non-final fix, based on instructions received from the UE.

An example method of improving multiple location reporting in LTE Positioning Protocol (LPP) messaging at a user equipment (UE), according to the description, comprises receiving a first LPP message from a location server (LS) comprising a request for multiple location reporting, sending at least one non-final LPP message to the LS, the at least one non-final LPP message comprising first location information for the UE and an indication that the LS shall not return an acknowledgment for the at least one non-final LPP message to the UE, and sending a final LPP message to the LS, the final LPP message comprising second location information for the UE and an indication that the LS shall return an acknowledgment for the final LPP message to the UE.

The method can comprise one or more of the following features. The first LPP message can comprise an LPP Request Location Information message, the at least one non-final LPP message can comprise an LPP Provide Location Information message, and the final LPP message can comprise an LPP Provide Location Information message. The first LPP message, the at least one non-final LPP message, and the final LPP message may be part of the same LPP transaction. The request for multiple location reporting can comprise a request for an early location fix and a final location fix, the first location information can comprise the early location fix, and the second location information can comprise the final location fix. The request for multiple location reporting can comprise a request for periodic location reporting or a request for triggered location reporting. The LS can comprise an enhanced serving mobile location center (E-SMLC). The first location information and the second location information can comprise location measurements or a location estimate.

An example user equipment (UE), according to the description, comprises a wireless communication interface, a memory, and a processing unit communicatively coupled with the memory and the wireless communication interface. The processing unit is configured to cause the UE to receive, via the wireless communication interface, a first Long-Term Evolution (LTE) Positioning Protocol (LPP) message from a location server (LS) comprising a request for multiple location reporting, send, via the wireless communication interface, at least one non-final LPP message to the LS, the at least one non-final LPP message comprising first location information for the UE and an indication that the LS shall not return an acknowledgment for the at least one non-final LPP message to the UE, and send, via the wireless communication interface, a final LPP message to the LS, the final LPP message comprising second location information for the UE and an indication that the LS shall return an acknowledgment for the final LPP message to the UE.

The UE may further comprise one or more of the following features. The first LPP message may comprise an LPP Request Location Information message, and the processing unit may be further configured to cause the at least one non-final LPP message to comprise an LPP Provide Location Information message, and cause the final LPP message comprise an LPP Provide Location Information message. The processing unit may be further configured to cause the UE to receive the first LPP message, send the at least one non-final LPP message, and send the final LPP message as part of the same LPP transaction. Where the request for multiple location reporting comprises a request for an early location fix and a final location fix, the processing unit may be further configured to cause the first location information to comprise the early location fix and cause the second location information comprise the final location fix. The processing unit may be further configured to cause the UE to receive the request for multiple location reporting comprising a request for periodic location reporting or a request for triggered location reporting. The processing unit may be further configured to cause the UE to receive the request for multiple location reporting from the LS comprising an enhanced serving mobile location center (E-SMLC). The processing unit may be further configured to cause the UE to include, in the first location information and the second location information, location measurements or a location estimate.

An example apparatus, according to the description, comprises, means for receiving a first Long-Term Evolution (LTE) Positioning Protocol (LPP) message from a location server (LS) comprising a request for multiple location reporting, means for sending at least one non-final LPP message to the LS, the at least one non-final LPP message comprising first location information for the UE and an indication that the LS shall not return an acknowledgment for the at least one non-final LPP message to the apparatus, and means for sending a final LPP message to the LS, the final LPP message comprising second location information for the apparatus and an indication that the LS shall return an acknowledgment for the final LPP message to the apparatus.

The apparatus may comprise one or more of the following features. The means for receiving the first LPP message may include means for receiving a first LPP message comprising an LPP Request Location Information message, and the apparatus may further comprise means for causing the at least one non-final LPP message to comprise an LPP Provide Location Information message and means for causing the final LPP message to comprise an LPP Provide Location Information message. The apparatus may further comprise means for receiving the first LPP message, sending the at least one non-final LPP message, and sending the final LPP message as part of the same LPP transaction. The apparatus may further comprise means for, where the request for multiple location reporting comprises a request for an early location fix and a final location fix, causing the first location information to comprise the early location fix and causing the second location information to comprise the final location fix. The apparatus may further comprise means for receiving the request for multiple location reporting comprise means for receiving a request for periodic location reporting or means for receiving a request for triggered location reporting. The means for receiving the request for multiple location reporting from the LS may comprise means for communicating with an enhanced serving mobile location center (E-SMLC). The means for sending the at least one non-final LPP message may comprise means for including, in the first location information, location measurements or a location estimate.

An example non-transitory computer-readable medium, according to the description, has instructions embedded thereon for improving multiple location reporting in Long-Term Evolution (LTE) Positioning Protocol (LPP) messaging at a user equipment (UE). The instructions include computer code for receiving a first Long-Term Evolution (LTE) Positioning Protocol (LPP) message from a location server (LS) comprising a request for multiple location reporting, sending at least one non-final LPP message to the LS, the at least one non-final LPP message comprising first location information for the UE and an indication that the LS shall not return an acknowledgment for the at least one non-final LPP message to the UE, and sending a final LPP message to the LS, the final LPP message comprising second location information for the UE and an indication that the LS shall return an acknowledgment for the final LPP message to the UE.

The non-transitory computer-readable medium may comprise one or more of the following features. The computer code for receiving the first LPP message may include computer code for receiving a first LPP message comprising an LPP Request Location Information message, the instructions may further comprise computer code for causing the at least one non-final LPP message to comprise an LPP Provide Location Information message, and causing the final LPP message to comprise an LPP Provide Location Information message. The non-transitory computer-readable medium may further comprise computer code for receiving the first LPP message, sending the at least one non-final LPP message, and sending the final LPP message as part of the same LPP transaction. The non-transitory computer-readable medium may further comprise computer code for, where the request for multiple location reporting comprises a request for an early location fix and a final location fix, causing the first location information to comprise the early location fix and causing the second location information to comprise the final location fix. The computer for receiving the request for multiple location reporting may comprise computer code for receiving a request for periodic location reporting or computer code for receiving a request for triggered location reporting. The computer for receiving the request for multiple location reporting from the LS may comprise computer code for communicating with an enhanced serving mobile location center (E-SMLC). The computer for sending the at least one non-final LPP message may comprise computer to for including, in the first location information, location measurements or a location estimate.

BRIEF DESCRIPTION OF DRAWINGS

Non-limiting and non-exhaustive aspects are described with reference to the following figures, wherein like reference numerals refer to like parts or like elements throughout the various figures unless otherwise specified.

Figure 1:
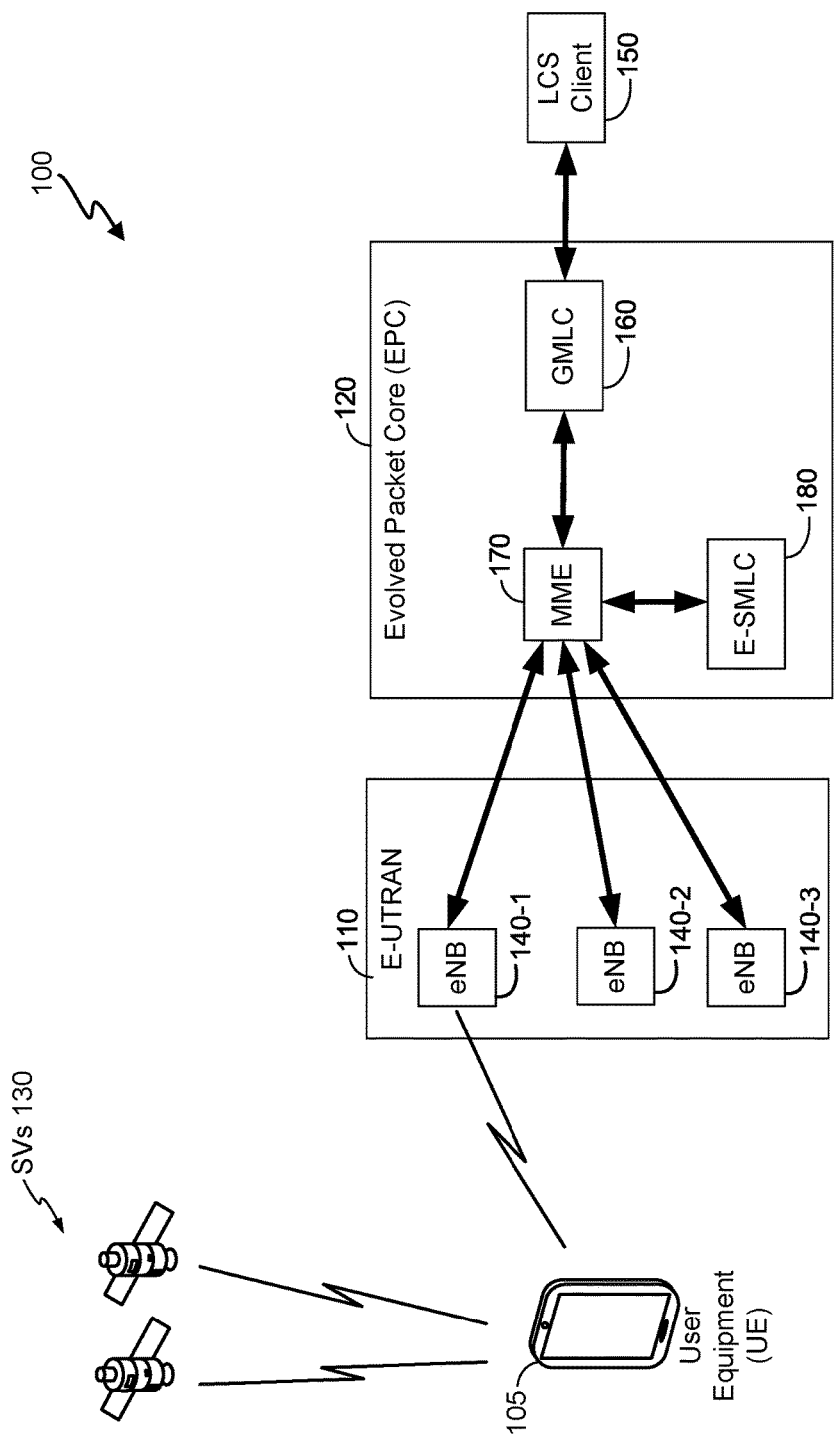
FIG. 1 is a diagram of a communication system that may utilize a Long Term Evolution (LTE) network to determine a position of a user equipment (UE) using Control Plane (CP) location services, according to an embodiment.

In certain cases, a numeric label for a part or element may be followed by a hyphen and a numeric subscript to indicate a particular instance of the part or element. In such a case, reference to the numeric label without a subscript may refer to any instance of the part or element. As an example, there may be specific instances 140-1, 140-2 and 140-3 of an evolved eNodeB (eNB). A reference to an eNB 140 may then refer to any of the eNBs 140-1, 140-2 and 140-3.

DETAILED DESCRIPTION

Several illustrative embodiments are described below with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Some example techniques for determining the location of a user equipment (UE) are presented herein, which, as indicated, may involve the UE (e.g., a mobile device or mobile station), a location server (LS), a base station, and/or other devices. These techniques can be utilized in a variety of applications utilizing various technologies and/or standards, including the 3rd Generation Partnership Project (3GPP) Long Term Evolution (LTE) Positioning Protocol (LPP) and/or the Open Mobile Alliance (OMA) LPP Extensions (LPPe) protocol and the like.

A UE may comprise a mobile device such as, a mobile phone, smartphone, tablet or other mobile computer, a portable gaming device, a personal media player, a personal navigation device, a wearable device, an in-vehicle system (IVS), or other electronic device. As discussed below, position determination of a UE can be useful to the UE and/or other entities in a wide variety of scenarios such enabling navigation or direction finding for a user of the UE or enabling location of the UE for an emergency call. There are many methods already known to determine an estimated position of the UE, including methods that involve communicating measurement and/or other information between the UE and an LS.

For a Long-Term Evolution (LTE) network, Location Services (LCS) may help provide an estimated location (also known as a "location fix") of a UE to an LCS client. This estimated location can come to the LCS client in two phases: an "early-fix" (an initial location estimate with reasonably good accuracy) and a "final-fix" (a more accurate location estimate obtained at the end of an allowed positioning response time, which can use all the positioning methods available to the UE). These fixes can be determined via communications between the UE and a location server (LS), such as an enhanced serving mobile location center (E-SMLC).

For example, during the positioning process for emergency calls to a Public Safety Answering Point (PSAP) client in North America, an early-fix of the UE (having reasonably good accuracy) may be determined within several seconds after the call is routed to the PSAP. Then, in about 20 seconds or more, the final-fix of the UE (with ultimate positioning quality obtainable by the UE) could be provided to the PSAP. Current Control Plane (CP) and User Plane (UP) location services specifications allow end-to-end signaling flows (using the LTE Positioning Protocol (LPP) as a positioning protocol between the UE and the LS) that request and report the early-fix and the final-fix from the UE in a single positioning session/transaction in LTE networks.

For such multiple location reporting involving non-final and final position fixes, problems can arise when the UE is unable to effectively communicate non-final reporting information to the LS for a non-final position fix. Such instances can arise due to network problems, for example, and may ultimately compromise the network's ability to determine a final-fix of the UE. Techniques provided herein utilize an enhanced protocol to help mitigate the likelihood that such instances can take place in an LTE network.

FIG. 1 is a diagram of a communication system 100 that may utilize an LTE network to determine a position a UE 105 using CP location services, according to an embodiment. Here, the communication system 100 comprises a UE 105 and portions of an LTE network comprising an Evolved Universal Terrestrial Radio Access Network (E-UTRAN) 110 and an Evolved Packet Core (EPC) 120, which, along with providing positioning functionality, may provide data and voice communication to the UE 105. The communication system 100 may further utilize information from Global Navigation Satellite System (GNSS) satellite vehicles (SVs) 130. Additional components of the communication system 100 are described below. It will be understood that the LTE components illustrated compose only a part of a complete LTE network and a communication system 100 may include additional or alternative components. Arrows between components illustrate possible communication between the components, which may be implemented in one or more of various types of forms (wireless, wired, etc.). Other lines between components in FIG. 1 indicate wireless communication.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 130, Evolved Node Bs (eNodeBs, or eNBs) 140, external clients 150, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, personal digital assistant (PDA), tracking device, or some other portable or moveable device. Typically, though not necessarily, the UE 105 may support wireless communication using one or more Radio Access Technologies (RATs) such as using Global System for Mobile Communications (GSM), Code Division Multiple Access (CDMA), Wideband CDMA (WCDMA), LTE (e.g., using E-UTRAN 110 and EPC 120), High Rate Packet Data (HRPD), IEEE 802.11 WiFi (also referred to as Wi-Fi), Bluetooth® (BT), Worldwide Interoperability for Microwave Access (WiMAX), Fifth Generation (5G) New Radio (NR), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an LCS client 150 (e.g. via elements of EPC 120 not shown in FIG. 1 or possibly via Gateway Mobile Location Center (GMLC) 160) and/or enable the LCS client 150 to receive location information regarding the UE 105 (e.g. via GMLC 160). Moreover, it can be noted that, depending on various circumstances, the EPC 120 may comprise an EPC of the home network for the UE 105 or a visited network, in which case one or more components of the EPC 120 of the visited network may be in communication with the home network of the UE 105. Further, the GMLC 160 of a visited network EPC 120 may be communicatively connected to a GMLC in a home network (not shown in FIG. 1). A person of ordinary skill in the art will appreciate various configurations, to accommodate when the UE 105 is in a visited or a home network.

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the E-UTRAN 110 comprise eNBs 140. In FIG. 1, three eNBs 140 are shown—eNBs 140-1, 140-2 and 140-3, which are collectively and generically referred to herein as eNBs 140. However, a E-UTRAN 110 may comprise dozens, hundreds, or even thousands of eNBs 140. Access to the LTE network is provided to UE 105 via wireless communication between the UE 105 and one or more of the eNBs 140, which may provide wireless communications access to the EPC 120 on behalf of the UE 105 using LTE. In FIG. 1, the serving eNB for UE 105 is assumed to be eNB 140-1, although other eNBs (e.g. eNB 140-2 and/or eNB 140-3) may act as a serving eNB if UE 105 moves to another location or may act as a secondary eNB to provide additional throughout and bandwidth to UE 105. Some eNBs 140 in FIG. 1 (e.g. eNB 140-2 or eNB 140-3) may be configured to function as positioning-only beacons which may transmit signals (e.g. positioning reference signals (PRSs) and/or may broadcast assistance data to assist positioning of UE 105 but may not receive signals from UE 105 or from other UEs.

As noted, while FIG. 1 depicts nodes configured to communicate according to LTE communication protocols, nodes configured to communicate according to other wireless communication protocols may be used. Such nodes, configured to communicate using different protocols, may be controlled, at least in part, by the EPC 120 or by another core network that may be similar to EPC 120. As an example, in a network providing wireless access using NR, E-UTRAN 110 may be replaced by a Next Generation Radio Access Network (NG-RAN) that contains NR NodeBs (gNBs) in place of eNBs 140 and connects to a 5G Core Network (5GC) in place of EPC 120. Further, the 5GC may then contain a Location Management Function in place of E-SMLC 180. However, an LPP protocol or a positioning protocol similar to LPP (e.g., an NR positioning protocol (NPP)) may still be used to help locate UE 105 and the various techniques described herein may be applicable to such positioning of UE 105.

The eNBs 140 can communicate with a Mobility Management Entity (MME) 170, which, for positioning functionality, communicates with an Enhanced Servicing Mobile Location Center (E-SMLC) 180. The MME 170 may support mobility of the UE 105, including cell change and handover and may participate in supporting a signaling connection to the UE 105 and possibly data and voice bearers for the UE 105. The E-SMLC 180 may support positioning of the UE 105 when UE 105 accesses the E-UTRAN 110 and may support position methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), Wireless Local Area Network (WLAN) positioning, and/or other position methods. The E-SMLC 180 may also process location requests for the UE 105, e.g., received from the MME 170 or from the GMLC 160. In some embodiments, a node/system that implements the E-SMLC 180 may additionally or alternatively implement other types of location-support modules, such as a Secure User Plane Location (SUPL) Location Platform (SLP). It will be noted that in some embodiments, at least part of the positioning functionality (including derivation of UE 105's location) may be performed at UE 105 (e.g., using signal measurements for signals transmitted by SVs 130 and assistance data provided to UE 105 by E-SMLC 180).

The Gateway Mobile Location Center (GMLC) 160 may support a location request for the UE 105 received from an LCS client 150 and may forward such a location request to the MME 170 for forwarding by MME 170 to E-SMLC 180 or may forward the location request directly to E-SMLC 180. A location response from E-SMLC 180 (e.g. containing a location estimate for UE 105) may be similarly returned to GMLC 160 either directly or via MME 170 and GMLC 160 may then return the location response (e.g., containing the location estimate) to LCS client 150. It can be noted that GMLC 160 is shown in FIG. 1 as connected the MME 170, although it may additionally or alternatively be connected with the E-SMLC 180.

The E-SMLC 180 and the eNBs 140 may communicate using LTE Positioning Protocol A (LPPa) defined in 3GPP Technical Specification (TS) 36.455, with LPPa messages being transferred between the eNBs 140 and the E-SMLC 180 via the MME 170. Moreover, E-SMLC 180 and UE 105 may communicate using LPP defined in 3GPP TS 36.355, where LPP messages are transferred between the UE 105 and the E-SMLC 180 via the MME 170 and a serving eNB 140-1 for UE 105. The LPP protocol may be used to support positioning of UE 105 using UE-assisted and/or UE-based position methods such as A-GNSS, RTK, OTDOA and/or ECID. With UE-assisted positioning, UE 105 may obtain location measurements and return the location measurements to E-SMLC 180 for computation of a location estimate for UE 105. With UE-based positioning, UE 105 may obtain location measurements and compute a location estimate from the measurements—e.g. using assistance data provided by E-SMLC 180. The LPPa protocol may be used to support positioning of UE 105 using network based position methods such as ECID (when used with measurements of UE 105 obtained by an eNB 140) and/or may be used by E-SMLC 180 to obtain location related information from eNBs 140 such as parameters defining transmission of a positioning reference signal (PRS) for the OTDOA position method from eNBs 140.

In some embodiments, LPP messages can be encapsulated in LCS Application Protocol (LCS-AP) messages and in Non-Access Stratum (NAS) messages to be transported between UE 105 and E-SMLC 180. In particular, between the MME 170 and E-SMLC 180, an LPP message may be contained in an LCS-AP message. (e.g. as defined in 3GPP TS 29.171.) Between the MME 170 and eNB 140, an LPP message may be encapsulated in a NAS message which is then contained in an S1 Application Protocol message (e.g. as defined in 3GPP TS 36.413.) Between the UE 105 and eNB 140, the LPP message can be encapsulated in an NAS message which is then contained in a Radio Resource Control (RRC) message.

Information provided by an eNB 140 to the E-SMLC 180 using LPPa may include timing and configuration information for PRS transmission from the eNB 140 and/or location coordinates for the eNB 140. The E-SMLC 180 can then provide some or all of this information to the UE 105 as assistance data in an LPP message via the E-UTRAN 110 and the EPC 120.

An LPP message sent from the E-SMLC 180 to the UE 105 may instruct the UE 105 to do any of a variety of things, depending on desired functionality. For example, the LPP message could contain an instruction for the UE 105 to obtain measurements for GNSS (or A-GNSS), Wireless Local Area Network (WLAN), and/or OTDOA (or some other position method). In the case of OTDOA, the LPP message may instruct the UE 105 to obtain one or more measurements (e.g. Reference Signal Time Difference (RSTD) measurements) of PRS signals transmitted within particular cells supported by particular eNBs 140 (or supported by some other type of base station). An RSTD measurement may comprise the difference in the times of arrival at the UE 105 of a signal (e.g. a PRS signal) transmitted or broadcast by one eNB 140 and a similar signal transmitted by another eNB 140. The UE 105 may send the measurements back to the E-SMLC 180 in an LPP message via the serving eNB 140-1 and the MME 170.

It is noted that the techniques described herein may be applicable to a CP location solution. In a CP location solution, signaling (e.g. including positioning protocol messages such as LPP or LPPa messages) to support location of UE 105 may be transferred between participating entities (e.g. GMLC 160, MME 170, E-SMLC 180, eNB 140-1 and UE 105) using existing signaling interfaces and protocols for EPC 120 and E-UTRAN 110. In contrast, in a UP location solution such as SUPL, signaling to support location of UE 105 may be transferred between participating entities (e.g. UE 104 and an SLP) using data bearers (e.g. using the Internet Protocol (IP) and/or Transmission Control Protocol (TCP)).

Returning again to the functionality of the UE 105 to provide an early fix and a final fix, E-SMLC 180 functions as an LS to which the user equipment 105 can communicate the early fix and final fix via LPP. (This information can then be relayed to the LCS client 150). When providing the early fix and the final fix, a CP solution according to the current LPP standard specifies:

(A) Each LPP message may carry an acknowledgement request and/or an acknowledgement indicator. A LPP message including an acknowledgement request (i.e., that include the information element (IE) ackRequested set to TRUE) shall also include a sequence number. Upon reception of an LPP message which includes the IE ackRequested set to TRUE, a receiver returns an LPP message with an acknowledgement response (i.e., that includes the ackIndicator IE set to the same sequence number of the message being acknowledged). An acknowledgement is returned for each received LPP message that requested an acknowledgement including any duplicate(s). Once a sender receives an acknowledgement for an LPP message, and provided any included sequence number is matching, it is permitted to send the next LPP message.

(B) When an LPP message which requires acknowledgement is sent and not acknowledged, it is resent by the sender following a timeout period up to three times. If still unacknowledged after that, the sender aborts all LPP activity for the associated session.

The LPP protocol as described above in (A) and (B), however, may be problematic in certain circumstances, as described below in relation to FIG. 2.

Figure 2:
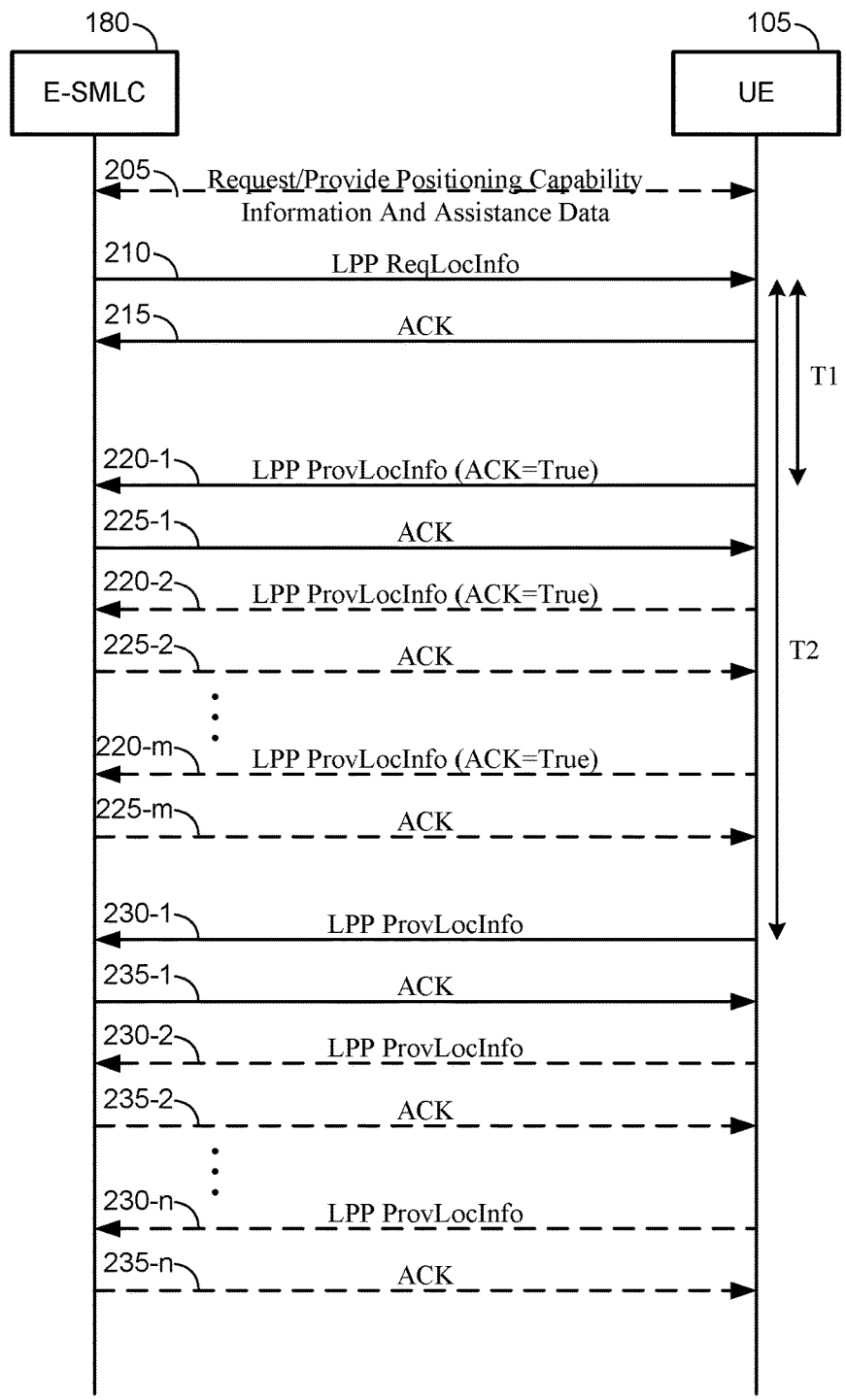
FIG. 2 is a signaling flow diagram illustrating an example signaling flow between a UE and a location server (LS).

FIG. 2 is a signaling flow diagram of a typical CP Network Initiated Location Request (NI-LR) signaling flow between a UE 105 and an E-SMLC 180. Here, both UE 105 and E-SMLC 180 send a message requiring an acknowledgement (or "ACK"). This may apply, for example, to Emergency Services (e.g., E911 in USA, where the LCS client 150 may comprise a PSAP). Here, the messages illustrated in FIG. 2 may represent messages belonging to a single LPP transaction between the UE 105 and the E-SMLC 180, although the functionality at action 205 may optionally be part of a separate transaction.

The process can begin at action 205, where the UE 105 and the E-SMLC 180 can request and/or provide information regarding positioning capability information and assistance data. During this exchange, for example, the UE 105 may indicate its positioning capabilities to the E-SMLC 180, and the E-SMLC 180 may respond by providing corresponding assistance data.

At action 210, the E-SMLC 180 can send an LPP Request Location Information ("ReqLocInfo") message, which may be acknowledged by the UE 105 at action 215. The request for location information sent by the E-SMLC 180 may trigger both early-fix and final-fix reporting sent by the UE 105 (and described in more detail below). It will be understood, however, that other types of triggers may cause the UE 105 to send early and final position fixes.

Depending on the location information to be returned, the UE 105 may send an LPP Provide Location Information ("ProvLocInfo") messages for non-final, early-fix reporting at action 220-1. Optionally, the early-fix reporting may comprise multiple messages, in which case one or more additional messages (e.g. actions 220-2 through 220-m) are sent. Multiple messages may be used for early-fix and/or final-fix reporting in circumstances, for example, where there is not enough room in a single message for a full (early-fix and/or final-fix) report, or where different types of information are separated into different messages, or where periodic or triggered reporting is requested at action 210.

The type of information included in the early-fix reporting and/or final-fix reporting can vary, depending on capabilities of the UE 105, capabilities of the E-SMLC 180, and/or other factors. The type of information included in the early-fix reporting and/or final-fix reporting may also be indicated in the LPP Request Location Information message of action 210. This information can include, for instance, a position fix (as determined by the UE 105) and/or other information to enable the E-SMLC 180 to determine a position fix for the UE 105, such as measurements of base station distances, timing signals, signal strength, etc. A person of ordinary skill in the art will appreciate the various types of information that can be included in such early-fix reporting and/or final-fix reporting.

As illustrated, each of the one or more messages 220 composing the early-fix reporting includes a request for the E-SMLC 180 to provide an ACK message (e.g., the LPP ProvLocInfo message may set ACK=TRUE), thereby resulting in a corresponding one or more ACK messages 225-1, 225-2, 225-m. In some instances, a time requirement for early-fix reporting may be set such that a first of the one or more early-fix reporting messages 220 is sent after the expiration of a first time period, T1. (The value of T1 may vary, and can be set in the LPP session by the E-SMLC 180 in an LPP Request Location Information message at action 210.)

After the one or more messages of the early-fix reporting have been sent by the UE 105, the UE 105 may send one or more Provide Location Information messages for final-fix reporting at action 230-1. Similar to early-fix reporting, the final-fix reporting may optionally comprise multiple messages, in which case one or more additional messages (e.g. actions 230-2 through 230-n) are sent. Again, each of the one or more messages composing the final-fix reporting may include a request for the E-SMLC 180 to provide an ACK message, in which case a corresponding one or more ACK messages 235-1, 235-2, 235-n. In some instances, a time requirement for a final-fix reporting may be set such that a first of the one or more early-fix reporting messages 220 may need to be sent by UE 105 prior to an expiration of a second time period, T2. (The value of T2 may also vary, and may be set within the LPP session. Again, this may be set by the E-SMLC 180 in an LPP Request Location Information message at action 210)

With this understanding of FIG. 2, FIG. 2 helps illustrate several points as follows.

First, a requirement of an ACK for early-fix transmissions can result in a failed positioning session even when the UE 105 is capable of sending final-fix information. In case any of the one or more ACKs sent by the E-SMLC 180 at action(s) 225 fail to reach the UE 105 (e.g. due to difficulty of transmission in LTE networks possibly for a short period of time), the UE 105 will retransmit the corresponding message (at action(s) 220) for which the ACK was requested up to three times, following a timeout period. According to the LPP standard, if the allowed retransmission attempts all fail, the UE 105 is to abort the positioning session entirely, resulting in the UE 105 not sending the final-fix transmission(s) (at action(s) 230) even if the network has recovered and is capable for signaling transmission at that time. The end result is that the positioning session is considered failed due to signaling transmission issues occurring during the transmission of the early-fix transmissions, and prior to when the transmissions of the final-fix are ready.

Second, transmission issues in one positioning transaction can result in abortion of concurrent positioning transactions. FIG. 2 shows the LPP signaling flow introduced by one LPP positioning transaction (which may have a unique transaction identifier). Current LPP standards allow concurrent LPP positioning transactions (e.g., with different transaction identifiers) as long as they are not requesting multiple positioning for the same positioning method. For example, a first LPP positioning transaction may use GNSS positioning and a second LPP positioning transaction may use OTDOA positioning. An un-acknowledged LPP Provide Location Information (ProvLocInfo) message in the second LPP positioning transaction may cause the abortion of all existing LPP transactions (including the first LPP positioning transaction). This is because LPP standards specify that "if still unacknowledged after that, the sender aborts all LPP activity for the associated session."

Third, a "timeout period" between retransmission attempts can exacerbate the previous problems. Under current LPP protocol, each Provide Location Information message allows three retransmissions in cases where a corresponding ACK message is not received, and there can be multiple Provide Location Information messages (e.g., m messages, as illustrated in FIG. 2) for sending the entire early-fix report. Thus, given the timeout period between retransmission attempts by the UE 105, it is possible that the UE 105 may be still waiting for an ACK of a Provide Location Information message of the early-fix report (at action(s) 225 in FIG. 2) by the E-SMLC 180 at the time for final-fix reporting. In this case, per LPP standard, the UE 105 may not be permitted to send the LPP message(s) of the final-fix report, although the final-fix may be available at that time.

Thus, as noted above, the failure to transmit final-fix information can cause issues where a precise location of the UE 105 is desirable. This is especially the case in emergency situations, as described above, where a PSAP may have no other indication of where a person needing emergency services may be located. Techniques provided herein address the issues above (and other issues) by causing the UE 105 not to request acknowledgement of early-fix transmissions.

Per LPP standard, a UE 105 shall omit sending a Provide Location Information message (at action(s) 220) if the early location information is not available at the expiration of the time value in the responseTimeEarlyFix IE (e.g., T1) set in the Request Location Information message (at action 210). For emergency service, the E-SMLC 180 is expecting the early-fix, but E-SMLC 180 can still functionally support the emergency session without the input from the early-fix reported by the UE 105. For example, the E-SMLC 180 can derive a sector/cell-based location estimate without the early-fix returned from UE 105.

Therefore, according to some embodiments, techniques provided herein include the following for the LPP immediate location request:

(A) For the Request Location Information message sent by the E-SMLC 180 as a location request to the UE 105 at action 210, the E-SMLC 180 may ask for acknowledgement.

(B) For the Provide Location Information message(s) sent by the UE 105 at action(s) 220 as an early-fix reporting, the UE 105 does not ask for acknowledgement.

(C) For the Provide Location Information message(s) sent by the UE 105 at action(s) 230 as a final-fix reporting, the UE 105 may ask for an acknowledgement.

Figure 3:
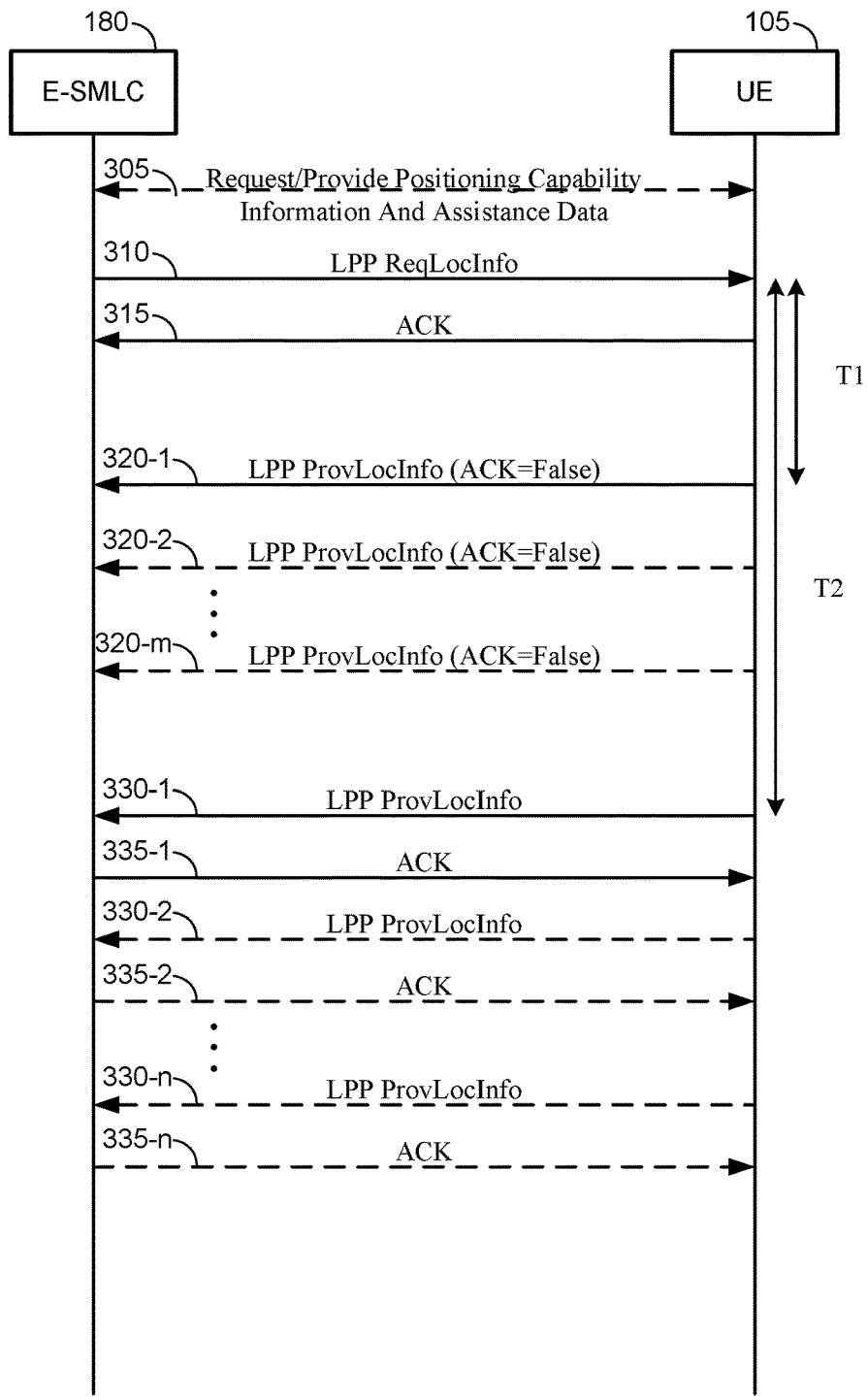
FIG. 3 is a signaling flow diagram similar to the signaling flow diagram of FIG. 2, but implementing techniques described herein, according to an embodiment.

FIG. 3 illustrates an example CP Network Initiated Location Request (NI-LR) signaling flow, according to an embodiment. Here, the signaling flow is similar to the signaling flow in FIG. 2, and actions 305 to 335-n in FIG. 3 generally echo similar actions to actions 205 to 235-n, but without acknowledgement requests sent by the UE 105 as an early-fix reporting at action(s) 320 (e.g., ACK=False). (Again, dotted arrows represent optional messages where, early-fix reporting and/or final-fix reporting is composed of two or more LPP Provide Location Information messages.) It will be understood that, embodiments may vary, depending on desired functionality. A person of ordinary skill in the art will appreciate that particular aspects illustrated in FIG. 3, such as the lengths of time periods T1 and/or T2, the number of early-fix and/or final-fix reporting messages, the type of LS (which, may be different than an E-SMLC 180 in some embodiments), message types, and/or other features of the signaling flow may vary.

As can be seen in FIG. 3, without the ACK(s) from the E-SMLC 180 during the early-fix reporting at action(s) 320 (and associated retransmission attempts, timeout periods, etc.), it is more likely that the UE 105 will complete its early-fix reporting at the time final-fix reporting is to begin (before T2 elapses).

More generally, the techniques discussed herein may provide any of a variety of advantages over traditional signaling flows that include acknowledgement requests. For example, the signaling flow can avoid retransmissions for early-fix report completely, therefore reducing signaling traffic and saving UE processing. The disclosed techniques may prevent the final-fix reporting from being blocked by a long retransmission period introduced by the early-fix reporting, improving the success rate of positioning support for emergency and/or other services. The techniques herein may additionally or alternatively reduce the risk of aborting the entire transaction (and potentially one or more related transactions) due to temporary network transmission difficulty, thereby enabling the success rate of positioning support in various situations, including for emergency services, to be improved.

It can be further noted that the techniques herein can be used, not only for emergency calls (e.g., involving a PSAP LCS client), but in any LPP signaling flow involving multiple (non-final and final) reporting (e.g., similar to the early-fix and final-fix reporting of the signaling flows illustrated in FIGS. 2 and 3). For example, in addition to immediate location request (as described above for early-fix and final-fix reporting), LPP also allows an LS to send a periodic or a triggered location request to a UE. The UE is expected to return multiple reports back to the LS at schedule interval or at the occurrence of the defined triggering event, using LPP Provide Location Information in the same fashion as described above.

As an example in an LPP periodic reporting signaling flow, the LS can request non-final and final reports of location information to be sent by a UE 105 at a specified interval (e.g., two seconds). Traditionally, if the UE 105 requests acknowledgement for a periodic reporting message, it would have to receive an ACK from the LS before it can send a subsequent periodic reporting message. If no acknowledgement is received, the UE 105 will start retransmitting the un-acknowledged message, which may cause skipping of subsequent periodic reporting or even lead to undesired early termination of the periodic reporting call flow. However, according to techniques herein, if the UE 105 requests no acknowledgement for a periodic reporting message, these issues do not arise.

As an example in an LPP triggered reporting signaling flow, the LS can request non-final and final reports of location information to be sent by the UE 105 whenever UE 105 changes its serving cell (e.g., eNB). Depending on the RF environment around the UE 105, there can be many (e.g. dozens of) back-to-back triggered reporting in a short period of time (e.g. a few minutes). If the UE 105 requests acknowledgement for the triggered reporting message, UE 105 may need to receive an acknowledgement from the LS before it can send a subsequent message when a change-of-cell occurs. If no acknowledgement is received, the UE 105 will start retransmitting the un-acknowledged message, which may cause skipping of subsequent triggered reporting or even lead to undesired early termination of the triggered reporting signaling flow. However, according to techniques herein, if the UE 105 requests no acknowledgement for a periodic reporting message, these issues do not arise.

Thus, where "final-fix reporting" comprises the very last reporting before the transaction is considered complete (e.g., when the number of reports required are fulfilled) and a "non-final-fix reporting" comprises any reporting before the final-fix reporting, embodiments of the techniques disclosed herein generally may be implemented in for LPP periodic/triggered location requests as follows:

(A) For a Request Location Information message sent by an LS as a location request to a UE 105, the LS may ask for an acknowledgement.
(B) For the Provide Location Information sent by the UE 105 for non-final fix reporting, the UE 105 does not ask for an acknowledgement.
(C) For the Provide Location Information sent by the UE 105 for final-fix reporting, the UE may ask for an acknowledgement.

Figure 4:
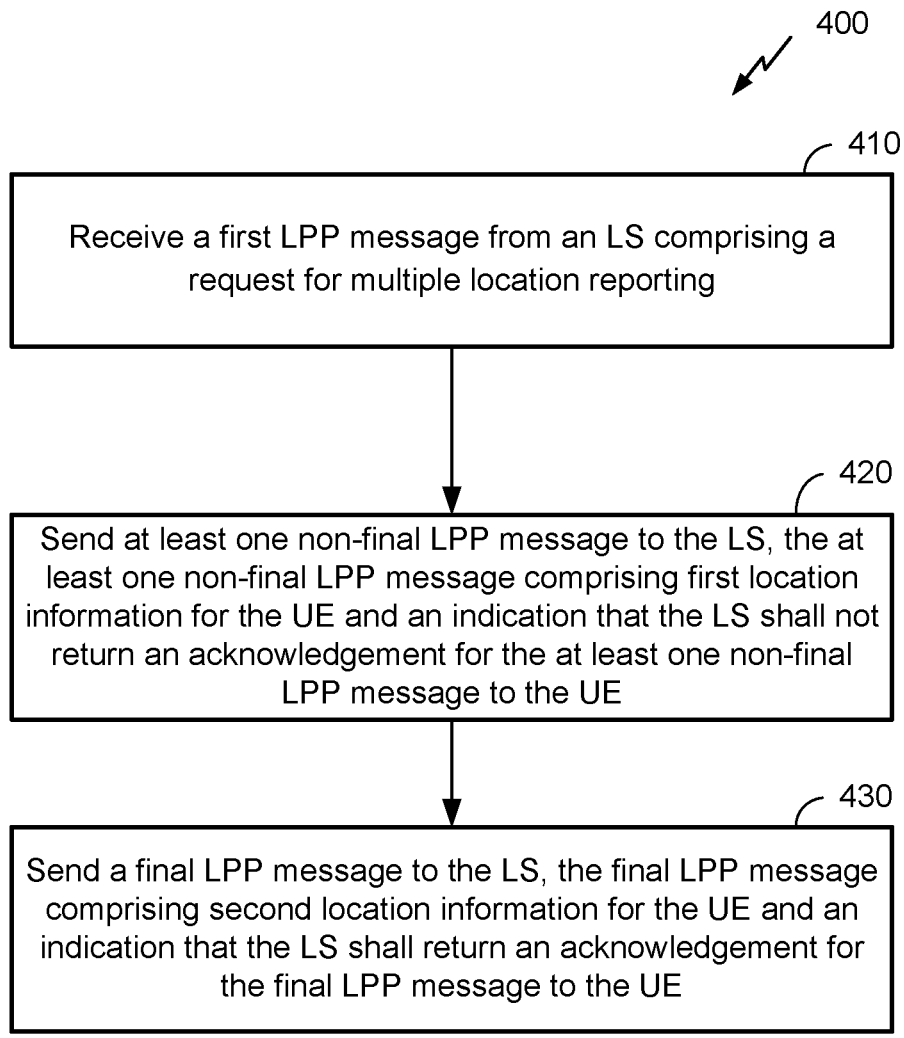
FIG. 4 is a method flow diagram illustrating an example method of improving multiple reporting in LTE Positioning Protocol (LPP) messaging, according to an embodiment.

FIG. 4 is a method flow diagram illustrating a method 400 of improving multiple reporting in LPP messaging, according to an embodiment. Any or all of the functions illustrated in the blocks of the method 400 may be performed by software and/or hardware components of a UE, such as the components of the UE 105 illustrated in FIG. 5 and described herein below.

The functionality at block 410 comprises receiving a first LPP message from an LS comprising a request for the multiple location reporting. In some embodiments, as previously described, the LS may comprise an E-SMLC (e.g. E-SMLC 180). In some embodiments, the first LPP message is an LPP Request Location Information message. In some embodiments, the request for multiple location reporting can comprise a request for periodic location reporting and/or a request for triggered location reporting. In some embodiments, the request for multiple location reporting can comprise a request for an early location fix followed by a final location fix. As previously indicated, the first LPP message may be part of (e.g. may include) an LPP transaction having a PSAP LCS client. More generally, the LPP transaction initiated in block 410 may comprise any LPP transaction that uses at least one non-final fix and a final fix.

Figure 5:
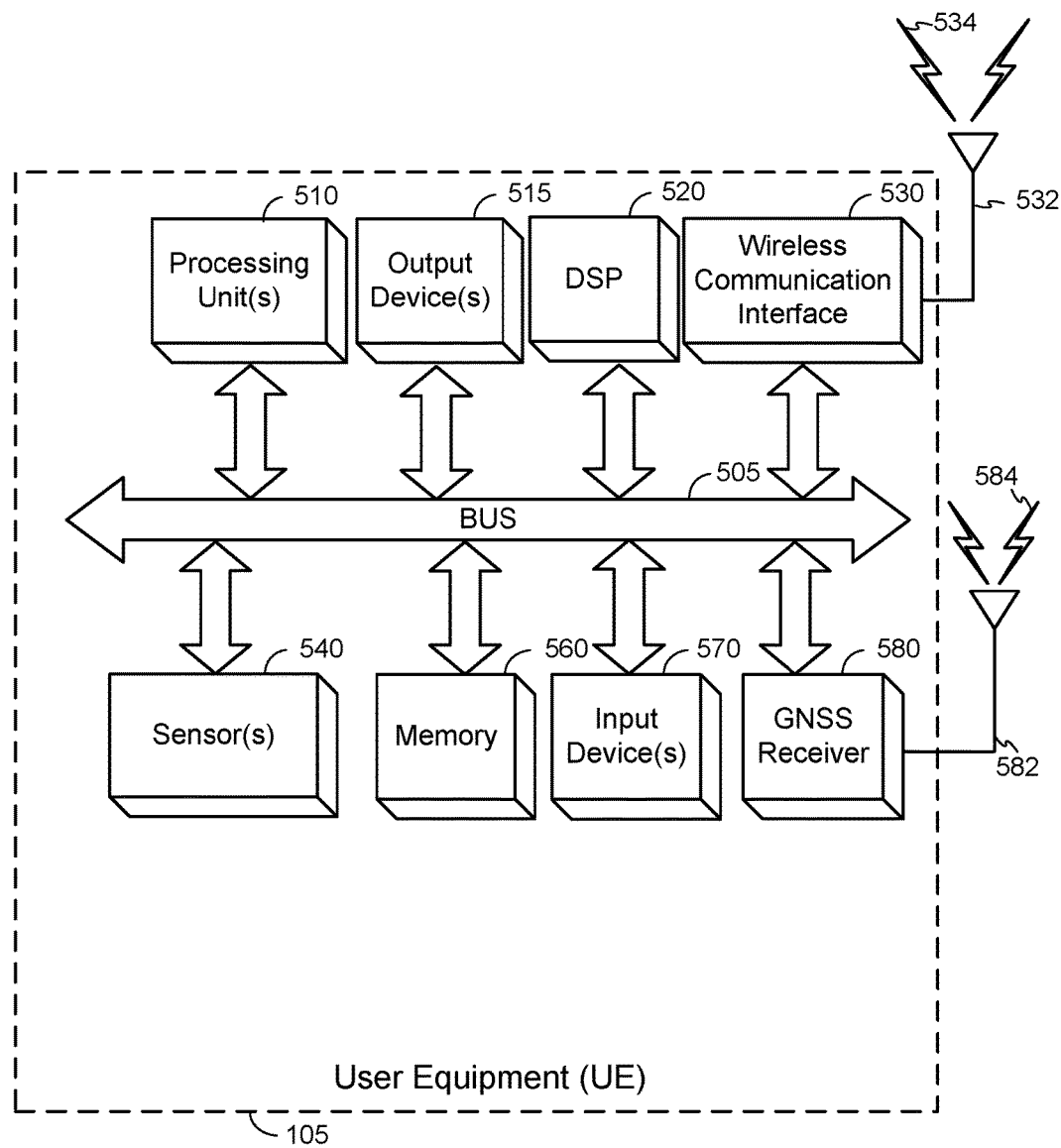
FIG. 5 is a block diagram of a UE, according to an embodiment.

Means for performing the function at block 410 can include, for example, processing unit(s) 510, wireless communication interface 530, wireless communication antenna(s) 532, bus 505, memory 560, and/or other components of a UE 105 as illustrated in FIG. 5 and described herein below.

At block 420, at least one non-final LPP message is sent to the LS. Here, the at least one non-final LPP message comprises first location information (e.g., early-fix reporting, which can include location information for an early fix) and an indication that the LS shall not return an acknowledgement for the at least one non-final LPP message to the UE. In particular, where the at least one non-final LPP message comprises an LPP Provide Location Information message, the UE may set an ACK value (e.g. an ACK value that is part of the LPP message or LPP message header) to "false." In some embodiments, sending the location information corresponding to the at least one non-final fix may be in response to receiving a request from the LS (e.g. in the first LPP message) for the location information corresponding to both the at least one non-final fix and the final fix.

Means for performing the function at block 420 can include, for example, processing unit(s) 510, wireless communication interface 530, wireless communication antenna(s) 532, bus 505, memory 560, sensor(s) 540, GNSS receiver 580, GNSS antenna 582, and/or other components of a UE 105 as illustrated in FIG. 5 and described herein below.

The functionality at block 430 comprises sending a final LPP message to the LS, where the final LPP message comprises second location information for the UE (e.g., final-fix reporting, which can include location information for a final fix) and an indication that the LS shall return an acknowledgement for the final LPP message to the UE. As described previously, this can be in accordance with the LPP protocol, and the location information may include information using all location resources available to the UE for an accurate final fix. In some embodiments, the first LPP message, the at least one non-final LPP message and the final LPP message can be part of the same LPP transaction. In some embodiments, the request for multiple location reporting can comprise a request for an early location fix and a final location fix. The first location information can comprise the early location fix and the second location information can comprise a final location fix. Depending on desired functionality, first and/or second location information can comprise location measurements and/or a location estimate.

Means for performing the function at block 430 can include, for example, processing unit(s) 510, wireless communication interface 530, wireless communication antenna(s) 532, bus 505, memory 560, sensor(s) 540, GNSS receiver 580, GNSS antenna 582, and/or other components of a UE 105 as illustrated in FIG. 5 and described herein below.

FIG. 5 illustrates an embodiment of a UE 105, which can be utilized in the embodiments previously described and illustrated in FIGS. 1-3. FIG. 5 is meant only to provide a generalized illustration of various components, any or all of which may be included or omitted in a particular type of device as appropriate. It can be noted that, in some instances, components illustrated by FIG. 5 can be localized to a single physical device and/or distributed among various networked devices, which may be disposed at different physical locations. The UE 105 may be configured to execute one or more functions of the methods described herein.

The UE 105 is shown comprising hardware elements that can be electrically coupled via a bus 505 (or may otherwise be in communication, as appropriate). The hardware elements may include a processing unit(s) 510 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 5, some embodiments may have a separate DSP 520, depending on desired functionality. The UE 105 also may comprise one or more input devices 570, which may comprise without limitation one or more touch screens, touch pads, microphones, buttons, dials, switches, and/or the like, which may provide for user input, for example. Output devices 515 may comprise, without limitation, one or more displays, light emitting diode (LED)s, speakers, and/or the like.

The UE 105 may also include a wireless communication interface 530, which may comprise without limitation a modem, a network card, an infrared communication device, a wireless communication device, and/or a chipset enabling communications using, for example, Bluetooth®, Bluetooth® Low Energy (BLE), IEEE 802.11, IEEE 802.15.4 (ZIGBEE®), Wi-Fi, a WiMAX™ device, cellular communication, and/or the like. The wireless communication interface 530 may permit data to be communicated with a network, computer system, and/or any other electronic device as described herein. The communication can be carried out via one or more wireless communication antenna(s) 532 that send and/or receive wireless signals 534.

Depending on desired functionality, the wireless communication interface 530 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 540, which may vary depending on the type of computing device. Such sensors may comprise, without limitation, accelerometer(s), gyroscope(s), cameras, magnetometers and/or other compasses, altimeters, microphones, proximity sensors, light sensors, and the like. In some embodiments, information acquired by the sensor(s) 540 may be used for location determination of the UE 105.

Embodiments of the UE 105 may also include a GNSS receiver 580 capable of receiving signals 584 from one or more GNSS satellite vehicles (e.g., SVs 130 of FIG. 1) using an GNSS antenna 582. Such positioning can be utilized to complement and/or incorporate the techniques described herein. The GNSS receiver 580 can extract a position of the UE 105, using conventional techniques, from GNSS satellite vehicles (SVs) of an GNSS system, such as Global Positioning System (GPS), Galileo, Global Navigation Satellite System (GLONASS), Compass, Quasi-Zenith Satellite System (QZSS) over Japan, Indian Regional Navigational Satellite System (IRNSS) over India, Beidou over China, and/or any other satellite positioning system (SPS). Moreover, the GNSS receiver 580 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSSes.

The UE 105 may further include and/or be in communication with a memory 560. The memory 560 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. This memory 560 may be used to store the images (or frames) captured by the forward-facing camera as described herein.

The memory 560 of the UE 105 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the UE 105 (and/or processing unit(s) 510 within a UE 105). In an aspect, then, such code and/or instructions can be used to configure and/or adapt a general purpose computer (or other device) to perform one or more operations in accordance with the described methods. The memory 560 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

FIG. 5 is a block diagram of various components of an LTE network, illustrating LPP message encapsulation, according to an embodiment. Here, components not only include a UE and LS (e.g., E-SMLC), but various other related components such as an e-NodeB (eNB), mobility management entity (MME), gateway mobile location center (GMLC), and LCS Client (e.g. the LCS client of FIG. 1), the functionality of which will be appreciated by a person of ordinary skill in the art.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Therefore, it is intended that claimed subject matter not be limited to the particular examples disclosed, but that such claimed subject matter may also include all aspects falling within the scope of appended claims, and equivalents thereof.

What is claimed is:

1. A method of improving multiple location reporting in Long-Term Evolution (LTE) Positioning Protocol (LPP) messaging at a user equipment (UE), the method comprising:
   receiving an LPP Request Location Information message from a location server (LS) comprising a request for multiple location reporting having an early location fix and a final location fix, the multiple location reporting comprising:
   first location information regarding at least one non-final location fix for the UE in response to the request, wherein the at least one non-final location fix comprises the early location fix, and
   second location information regarding the final location fix for the UE in response to the request;
   sending, during a predetermined time period for non-final fix reporting, a first LPP Provide Location Information message to the LS, the first LPP Provide Location Information message comprising:
at least a portion of the first location information for the UE, and
an indication that the LS shall not return an acknowledgment for the first LPP Provide Location Information message to the UE; and
sending, after the predetermined time period for non-final fix reporting, a second LPP Provide Location Information message to the LS, the second LPP Provide Location Information message comprising:
at least a portion of the second location information for the UE, and
an indication that the LS shall return an acknowledgment for the second LPP Provide Location Information message to the UE.

2. The method of claim 1, wherein the LPP Request Location Information message, the first LPP Provide Location Information message, and the second LPP Provide Location Information message are part of the same LPP transaction.

3. The method of claim 1, wherein the request for multiple location reporting comprises a request for periodic location reporting or a request for triggered location reporting.

4. The method of claim 1, wherein the LS comprises an enhanced serving mobile location center (E-SMLC).

5. The method of claim 1, wherein the first location information and the second location information comprise location measurements or a location estimate.

6. A user equipment (UE) comprising:
a wireless communication interface;
a memory; and
a processing unit communicatively coupled with the memory and the wireless communication interface and configured to cause the UE to:
receive, via the wireless communication interface, a Long-Term Evolution (LTE) Positioning Protocol (LPP) Request Location Information message from a location server (LS) comprising a request for multiple location reporting having an early location fix and a final location fix, the multiple location reporting comprising:
first location information regarding at least one non-final location fix for the UE in response to the request, wherein the at least one non-final location fix comprises the early location fix, and
second location information regarding the final location fix for the UE in response to the request;
send, via the wireless communication interface during a predetermined time period for non-final fix reporting, a first LPP Provide Location Information message to the LS, the first LPP Provide Location Information message comprising:
at least a portion of the first location information for the UE, and
an indication that the LS shall not return an acknowledgment for the first LPP Provide Location Information message to the UE; and
send, via the wireless communication interface after the predetermined time period for non-final fix reporting, a second LPP Provide Location Information message to the LS, the second LPP Provide Location Information message comprising:
at least a portion of the second location information for the UE, and
an indication that the LS shall return an acknowledgment for the second LPP Provide Location Information message to the UE.

7. The UE of claim 6, wherein the processing unit is further configured to cause the UE to receive the LPP Request Location Information message, send the first LPP Provide Location Information message, and send the second LPP Provide Location Information message as part of the same LPP transaction.

8. The UE of claim 6, the processing unit is further configured to cause the UE to receive the request for multiple location reporting comprising a request for periodic location reporting or a request for triggered location reporting.

9. The UE of claim 6, wherein the processing unit is further configured to cause the UE to receive the request for multiple location reporting from the LS comprising an enhanced serving mobile location center (E-SMLC).

10. The UE of claim 6, wherein the processing unit is further configured to cause the UE to include, in the first location information and the second location information, location measurements or a location estimate.

11. An apparatus comprising:
means for receiving a Long-Term Evolution (LTE) Positioning Protocol (LPP) Request Location Information message from a location server (LS) comprising a request for multiple location reporting having an early location fix and a final location fix, the multiple location reporting comprising:
first location information regarding at least one non-final location fix for a UE in response to the request, wherein the at least one non-final location fix comprises the early location fix, and
second location information regarding the final location fix for the UE in response to the request;
means for sending, during a predetermined time period for non-final fix reporting, a first LPP Provide Location Information message to the LS, the first LPP Provide Location Information message comprising:
at least a portion of the first location information for the UE, and
an indication that the LS shall not return an acknowledgment for the first LPP Provide Location Information message to the apparatus; and
means for sending, after the predetermined time period for non-final fix reporting, a second LPP Provide Location Information message to the LS, the second LPP Provide Location Information message comprising:
at least a portion of the second location information for the apparatus, and
an indication that the LS shall return an acknowledgment for the second LPP Provide Location Information message to the apparatus.

12. The apparatus of claim 11, further comprising means for receiving the Request Location Information LPP message, sending the first LPP Provide Location Information message, and sending the second LPP Provide Location Information message as part of the same LPP transaction.

13. The apparatus of claim 11, wherein the means for receiving the request for multiple location reporting comprise means for receiving a request for periodic location reporting or means for receiving a request for triggered location reporting.

14. The apparatus of claim 11, wherein the means for receiving the request for multiple location reporting from the LS comprise means for communicating with an enhanced serving mobile location center (E-SMLC).

15. The apparatus of claim 11, wherein the means for sending the first LPP Provide Location Information message comprise means for including, in the first location information, location measurements or a location estimate.

16. A non-transitory computer-readable medium having instructions embedded thereon for improving multiple location reporting in Long-Term Evolution (LTE) Positioning Protocol (LPP) messaging at a user equipment (UE), the instructions including computer code for:
receiving a Long-Term Evolution (LTE) Positioning Protocol (LPP) Request Location Information message from a location server (LS) comprising a request for multiple location reporting having an early location fix and a final location fix, the multiple location reporting comprising:
first location information regarding at least one non-final location fix for the UE in response to the request, wherein the at least one non-final location fix comprises the early location fix, and
second location information regarding the final location fix for the UE in response to the request;
sending, during a predetermined time period for non-final fix reporting, a first LPP Provide Location Information message to the LS, the first LPP Provide Location Information message comprising:
at least a portion of the first location information for the UE, and
an indication that the LS shall not return an acknowledgment for the first LPP Provide Location Information message to the UE; and
sending, after the predetermined time period for non-final fix reporting, a second LPP Provide Location Information message to the LS, the second LPP Provide Location Information message comprising:
at least a portion of the second location information for the UE, and
an indication that the LS shall return an acknowledgment for the second LPP Provide Location Information message to the UE.

17. The non-transitory computer-readable medium of claim 16, further comprising computer code for receiving the LPP Request Location Information message, sending the first LPP Provide Location Information message, and sending the second LPP Provide Location Information message as part of the same LPP transaction.

18. The non-transitory computer-readable medium of claim 16, wherein the computer code for receiving the request for multiple location reporting comprises computer code for receiving a request for periodic location reporting or computer code for receiving a request for triggered location reporting.

19. The non-transitory computer-readable medium of claim 16, wherein the computer for receiving the request for multiple location reporting from the LS comprises computer code for communicating with an enhanced serving mobile location center (E-SMLC).

20. The non-transitory computer-readable medium of claim 16, wherein the computer for sending the first LPP Provide Location Information message comprises computer to for including, in the first location information, location measurements or a location estimate.

* * * * *